(12) United States Patent
Haider et al.

(10) Patent No.: US 11,010,050 B1
(45) Date of Patent: May 18, 2021

(54) SYSTEMS AND METHODS FOR SWIPE-TO-LIKE

(71) Applicant: Twitter, Inc., San Francisco, CA (US)

(72) Inventors: Sara Haider, San Francisco, CA (US); Lisa Ding, Boulder, CO (US); Jonah Grant, San Francisco, CA (US); David Hart, Arlington, TX (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 16/841,349

(22) Filed: Apr. 6, 2020

Related U.S. Application Data

(60) Provisional application No. 62/830,308, filed on Apr. 5, 2019.

(51) Int. Cl.
*G06F 3/048* (2013.01)
*G06F 3/0488* (2013.01)
*G06F 3/0484* (2013.01)
*G06F 3/01* (2006.01)

(52) U.S. Cl.
CPC .......... *G06F 3/04883* (2013.01); *G06F 3/017* (2013.01); *G06F 3/0484* (2013.01)

(58) Field of Classification Search
CPC ..... G06F 3/04883; G06F 3/017; G06F 3/0484
See application file for complete search history.

(56) References Cited

U.S. PATENT DOCUMENTS

2015/0268826 A1* 9/2015 Langholz ............ G06F 3/04817
715/752
2017/0336958 A1* 11/2017 Chaudhri ............ G06F 3/04886

OTHER PUBLICATIONS

"How to Mute Conversations to Reduce Inbox Clutter" by Jon Knight published Nov. 30, 2017.*

* cited by examiner

*Primary Examiner* — Pei Yong Weng
(74) *Attorney, Agent, or Firm* — Nixon & Vanderhye, P.C.

(57) ABSTRACT

Example systems and methods are described for implementing a swipe-to-like feature. In an example implementation, a list of content items is displayed on a touchscreen display, and based on detecting input of a first gesture, such as, for example, a swipe gesture, for a first one of the content items in the list, associating a predetermined first sentiment with the first content item.

34 Claims, 9 Drawing Sheets

SYSTEMS AND METHODS FOR SWIPE-TO-LIKE

CROSS REFERENCE TO RELATED APPLICATIONS

This disclosure claims the benefit of U.S. Provisional Application No. 62/830,308 filed on Apr. 5, 2019, the entire content of which is herein incorporated in its entirety.

FIELD OF THE DISCLOSURE

This disclosure relates generally to user interfaces of communication devices, and in particular relates to associating sentiments with selected content items.

BACKGROUND

The use of social media for communications continues to be adopted by more and more segments of society, and the frequency of use such social media is also increasing. As the use of social media grows, it is important to optimize the display area of the communication/computing devices so that the most useful information can be displayed, and unnecessary clutter on the display can be avoided.

Many users interact with each other on social media by assigning sentiments such as "like" and "dislike" to messages. Thus, it is important that an efficient and convenient layout of the screen and techniques for signaling such sentiment are available for users to view.

SUMMARY OF EMBODIMENTS

Example embodiments provide an efficient and convenient technique of using a swipe gesture to selectively assign a sentiment to one or more content items in a listing of content items.

An example method embodiment comprises displaying a list of content items on a display screen, and based on detecting input of a first swipe gesture for a first one of the content items in the list, associating a predetermined first sentiment with the first content item.

An example client device embodiment comprises a network interface, a touchscreen display, and a processing system comprising at least one processor. The processing system is configured to display a list of content items on the touchscreen display, and based on detecting input of a first swipe gesture for a first one of the content items in the list, associate a predetermined first sentiment with the first content item.

A non-transitory computer readable storage medium embodiment stores program instructions that when executed by at least one processor of a computer, causes the computer to perform operations comprising displaying a list of content items on a touchscreen display, and based on detecting input of a first swipe gesture for a first one of the content items in the list, associating a predetermined first sentiment with the first content item.

A system embodiment comprises a server device, and a plurality of client devices connected to the server device over a communication network. The server device is configured to receive new content items from respective client devices and distribute the received new content items to groups of client devices, to receive selection information associated with the distributed new content items, and to update the distributed new content items in accordance with the received selection information. Each client device is configured to perform operations comprising displaying a list of content items on a display, and based on detecting input of a first swipe gesture for a first one of the content items in the list, associating a predetermined first sentiment with the first content item.

BRIEF DESCRIPTION OF THE DRAWINGS

The accompanying drawings facilitate an understanding of non-limiting, example embodiments of the disclosed technology. In the drawings:

FIG. 2 (FIGS. 2A, 2B, 2C and 2D) illustrates sequence of screens captured during a swipe-to-like operation in accordance with one or more example embodiments;

DETAILED DESCRIPTION OF EXAMPLE EMBODIMENTS

In the following description, for purposes of explanation, numerous specific details are set forth to provide a thorough understanding of the example embodiments. It will be evident, however, to a person skilled in the art, that the example embodiments may be practiced without these specific details.

Figure 1:
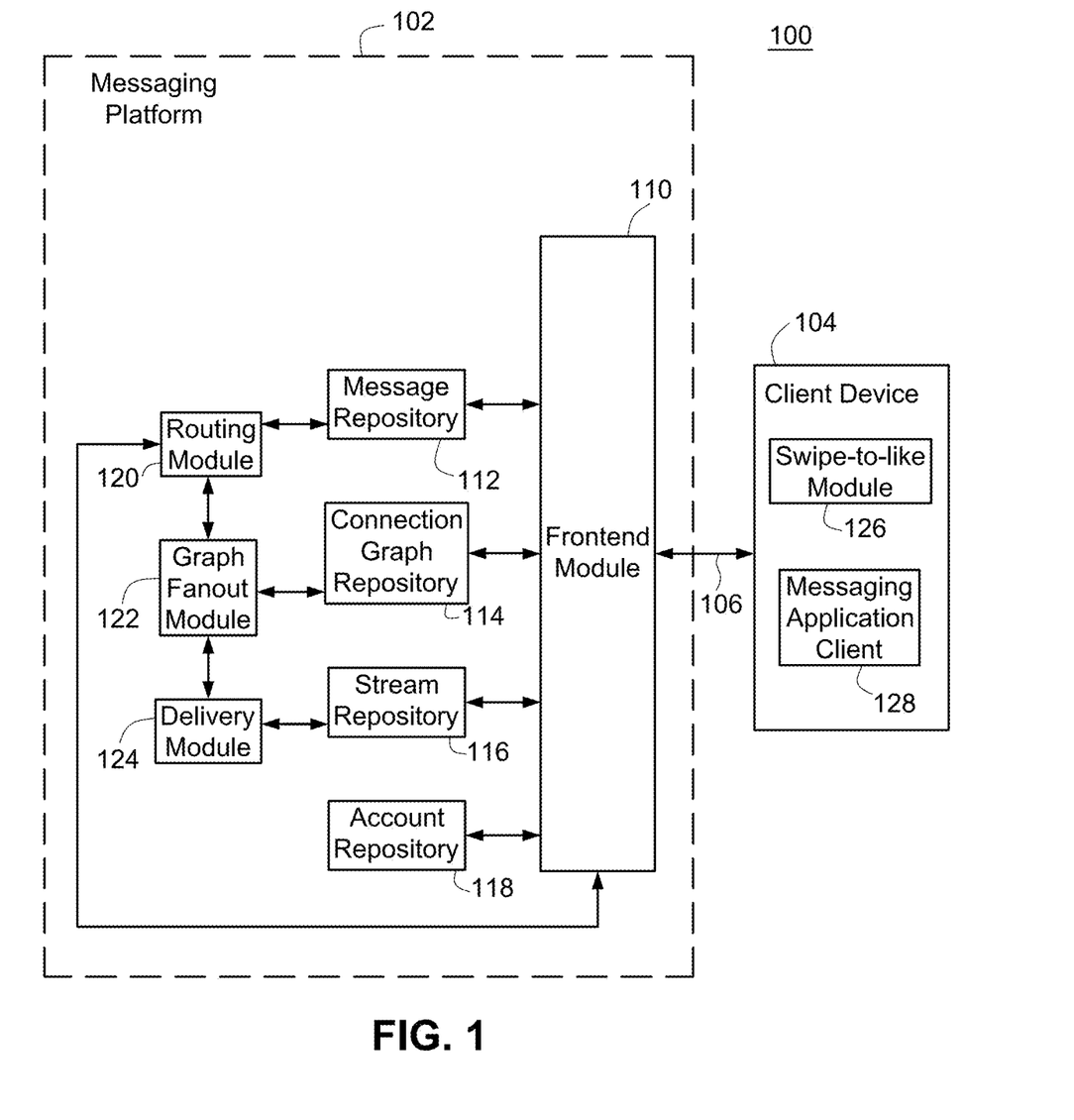
FIG. 1 illustrates a messaging system according to one or more example embodiments.

FIG. 1 illustrates a non-limiting example messaging system 100 according to some example embodiments. Messaging system 100 may operate to provide a social media service, such as, for example, Twitter. In example embodiments, the messaging system 100 implements a swipe-to-like feature by which content item selection by input of a swiping gesture by the user is enabled for associating a predetermined sentiment (e.g. a "like" sentiment) with the selected one or more content items (e.g., tweets or other social media messages, advertisements, email messages, news items, video, multimedia messages or text messages, etc.). Although the discussion below refers to "swipe-to-like", it will be appreciated that the systems and methods described herein are not limited to swipe gestures for liking content and that swipe gestures may be used for associating other sentiments to messages.

FIG. 1 shows the messaging system 100 which includes a messaging platform 102 and a client device 104 in accordance with one or more embodiments. The messaging platform 102 has multiple components including a frontend module 110, a message repository 112, a connection graph repository 114, a stream repository 116, an account repository 118, a routing module 120, a graph fanout module 122, and a delivery module 124. Various components of the messaging platform 102 can be located on the same device (e.g., a server, mainframe, desktop Personal Computer (PC), laptop, Personal Digital Assistant (PDA), telephone, mobile phone, kiosk, cable box, and any other device) or can be located on separate devices connected by a network (e.g., a local area network (LAN), the Internet, etc.). Those skilled in the art will appreciate that there can be more than one of each separate component running on a device, as well as any combination of these components within a given embodiment.

In one or more non-limiting example embodiments, the messaging platform 102 is a platform for facilitating real-time communication between one or more entities. For example, the messaging platform 102 may store millions of accounts of entities such as individuals, groups of individuals, software programs, businesses, and/or other entities (e.g., pseudonym accounts, novelty accounts, etc.). One or more users of each account may use the messaging platform 102 to send messages to other accounts inside and/or outside of the messaging platform 102. The messaging platform 102 may be configured to enable users to communicate in "real-time", i.e., to converse with other users with a minimal delay and to conduct a conversation with one or more other users during concurrent sessions. In other words, the messaging platform 102 may allow a user to broadcast messages and may display the messages to one or more other users within a reasonable time frame so as to facilitate a live conversation between the users. Recipients of a message may have a predefined graph relationship with an account of the user broadcasting the message. In one or more example embodiments, the user is not an account holder or is not logged in to an account of the messaging platform 102. In this case, the messaging platform 102 may be configured to allow the user to broadcast messages and/or to utilize other functionality of the messaging platform 102 by associating the user with a temporary account or identifier.

In one or more example embodiments, the messaging platform 102 connects users to other users (i.e., clients) of the messaging platform 102, exchanges social networking messages between connected users of the messaging platform 102, and provides an interface for a user to create and view social networking messages. In one or more example embodiments, social networking messages are broadcast social networking messages that are transmitted to at least a set of users. The users in the set may be self-selected (e.g., followers of the transmitting user) or users that satisfy a certain status with the transmitting user (e.g., belong to a group, friend, family, etc.). The social networking messages may include, for example, a comment from a user on a document, personal status update, a reference to a document, and any other information. For purposes of this disclosure, a social networking message (sometimes herein referred simply as a "message") can include a user authored message and/or any content (multimedia, audio, video, image, text, etc.) broadcasted/posted by a user of a messaging platform. In some embodiments, the listing of messages on which the first swipe gesture is made includes any at least one of social media messages, advertisements, email messages, news items, video, multimedia messages or text messages.

The example messaging platform 102 includes functionality to broadcast individual messages or streams of messages to one or more accounts based at least partially on a connection graph representing relationships between those accounts. A stream may be a dynamic list of messages associated with one or more accounts or can reflect any arbitrary organization of messages that is advantageous for the user of an account. The routing module 120 includes functionality to receive one or more social networking messages and to store the social networking messages in the message repository 112. The routing module 120 may include functionality to assign an identifier to the social networking message and to provide identification of a sender of the social networking message to the graph fanout module 122.

The graph fanout module 122 includes functionality to retrieve graph data from the connection graph repository 114 and to use the graph data to determine which accounts in the messaging platform 102 should receive the social networking message. The graph data, for example, may reflect which accounts in the messaging platform are "following" a particular account and are, therefore, subscribed to receive social networking messages from the particular account.

In one or more embodiments, the delivery module 124 includes functionality to receive a list of accounts from the graph fanout module 122 and the message identifier generated by the routing module 120 and to insert the message identifier into stream data associated with each identified account. The delivery module 124 may then store the message list in the stream repository 116. The stream data stored in the stream repository 116 may constitute one or more streams associated with one or more user accounts of the social network application. A stream may be a dynamic list of social networking messages associated with one or more accounts or may reflect any organization of social networking messages that is advantageous for the user of an account.

In one or more example embodiments, the frontend module 110 is a software application or a set of related software applications configured to communicate with external entities (e.g., client device 104). The frontend module 110 may include an application programming interface (API) and/or any number of other components used for communicating with entities outside of the messaging platform 102. The API may include any number of specifications for making requests from and/or providing data to the messaging platform 102. For example, a function provided by the API may provide artist/song recommendations to a requesting client 104.

In one or more example embodiments, the frontend module 110 is configured to use one or more of the data repositories (message repository 112, connection graph repository 114, stream repository 116, and/or account repository 118) to define streams for serving social networking messages (i.e., stream data) to a user of the account on the messaging platform 102. A user may use any client device 104 to receive the social networking messages. For example, where the user uses a web-based client to access the messaging platform 102, an API of the frontend module 110 may be utilized to define one or more streams and/or to serve the stream data to the client for presentation to the user. Similarly, different forms of message delivery may be handled by different modules in the frontend module 110. In one or more embodiments, the user may specify particular receipt preferences, which are implemented by the frontend module 110.

In one or more example embodiments, one or more of the data repositories (message repository 112, connection graph repository 114, stream repository 116, and/or account repository 146), is a database and/or storage service residing on one or more servers. For example, one or more of the data repositories may be implemented as a storage service using service-oriented architecture (SOA) and configured to receive requests for data and to provide requested data to other components of the social network system 100. In another example, the message repository 112 may include one or more tables in a distributed database management system (DBMS), a clustered database, a standalone flat file, and/or any storage software residing on one or more physical storage devices. Examples of a storage device may include, but are not limited to, a hard disk drive, a solid state drive, and/or other memory device. Any type of database or storage application may be used, in accordance with various example embodiments.

In one or more example embodiments, one or more of the data repositories (message repository 112, connection graph repository 114, stream repository 116, and/or account repository 118) is a separate application or set of applications residing on one or more servers external (and communicatively coupled) to the messaging platform 102. Alternatively, in one or more embodiments, one or more of the data repositories may be an integrated component of the messaging platform 102 and/or may reside, either partially or entirely, on one or more common hardware devices (e.g., a server).

In one or more example embodiments, the message repository 112 includes functionality to store messages and message metadata. The message metadata may include an identifier of the broadcasting/posting user account of the social networking message, a list of users that received the social networking message, a number of users that received the social networking message, statistics (e.g., a ratio of following user accounts to the broadcasting/posting user account that forward the social networking message to non-following user accounts to the broadcasting/posting user account that forward the social networking message), time and date in which the social networking message is transmitted, and other information. Sentiments, such as, but not limited to, "like" sentiments and/or "dislike" sentiments may also be associated with respective messages in the message repository. According to some example embodiments, a degree or magnitude may also be associated with the sentiments.

The connection graph repository 114 may store information about users and/or corresponding accounts. Specifically, the connection graph repository may relate user identifiers or one or more accounts of a user to user's preferences and history in the social network application. For example, the user preferences and history may include language preferences, following user accounts of a user account, topics that a user account is interested in, and any other information.

In some example embodiments, the messaging platform may include a message selection module (not shown in FIG. 1) and a swipe-to-like configuration module (not shown in FIG. 1) to support the swipe-to-like feature. However, it should be noted that in some embodiments, the swipe-to-like feature can be implemented without functions that are solely to support the swipe-to-like feature being implemented at the message platform 102. The swipe-to-like configurations module may include configuration information such as, for example, swipe-to-like swiping detection thresholds, predetermined sentiments, indicia of predetermined sentiments, animation characteristics for the indicia of predetermined sentiments, and assignable weights for the predetermined sentiments. Such configuration information may be provided by the messaging platform 102 to client device 104 over network connection 106, and the client device 104 may use the received configuration information in implementing swipe-to-like on its user interface.

The message selection module may operate to process the messages from message repository 112 before they are provided to the client device 104, in order to associate appropriate swipe-to-like configurations to the client device. The message selection module may also operate to process messages received from the client device before they are used to update the relevant repositories 112-118. It should be noted, however, that in some example embodiments, the swipe-to-like feature may be implemented entirely on the client device 104 with the messaging platform 102 providing only configuration information and the like for the feature.

The client device 104 may, in some example embodiments, run a social media application client 128 (e.g. Twitter app). The client device 104 also includes a swipe-to-like module 126 which enables the selection of social networking messages and the like by a swipe gesture in order to associate a predetermined sentiment, such as, a "like" gesture with the selected one or more social media messages.

FIG. 2 (FIGS. 2A, 2B, 2C and 2D) illustrates a non-limiting, example of a sequence of display screens according to an example embodiment. The sequence of display screens 202 (screens 202a, 202b, 202c and 202d) are a selection of screen captures obtained during a swipe-to-like operation in accordance with an example embodiment. The display screen may be a touchscreen of a client device, such as, for example, client device 104.

Figure 2A:
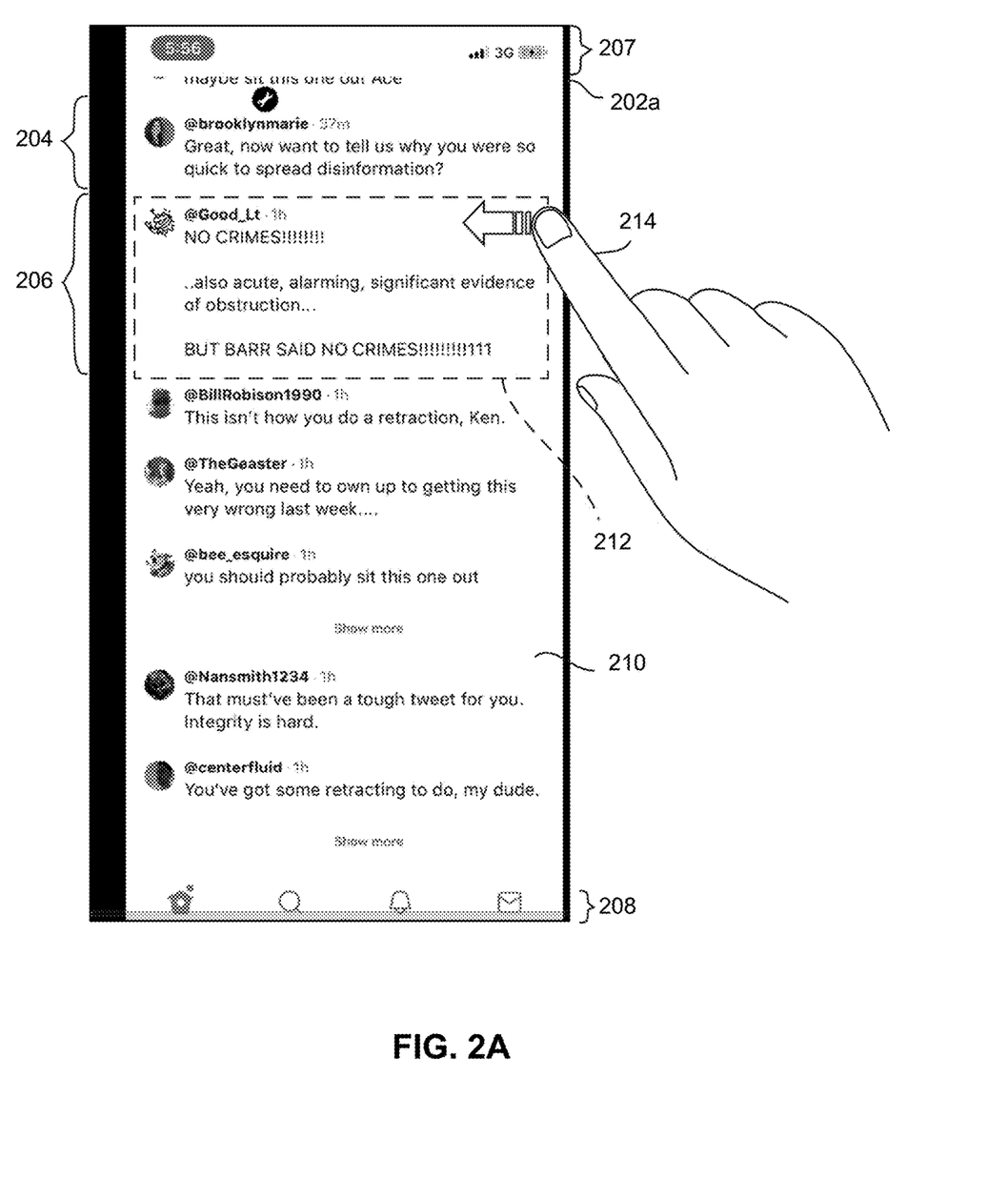

In the illustrated example, a listing of messages (e.g., a timeline) are displayed on the screen when the user of the client device 104 swipes one of the displayed messages. FIG. 2A shows the swipe gesture being made using an index finger 214, but any finger or thumb can be used for making the swipe gesture. According to some example embodiments, the touchscreen of the client device 104 may be configured to detect contact made using a pen, pointer, stylus, or other device to perform the swipe gesture. In some embodiments, in addition to, or alternatively to, detecting a swipe based on an input on the touchscreen a swipe on an area of the display screen of the client device may be detected based on non-touch gestures (e.g. hand or finger-based and/or motion-based gesture made over the display screen without touching the screen).

The example screens 202 (collectively screens 202a, 202b, 202c and 202d) may include a plurality of displayed messages, such as, for example, messages 204 and 206. In addition to the displayed messages, the screen 202 may include other displayed elements. For example, a "show more" button 210 operable to expose/display more of a particular message, or of a particular thread of messages may be displayed in relation to the corresponding message or thread. A title bar 207 and/or a tab bar 208 may also be displayed. The title bar 207 may include indicators for elements such as, for example, time, network connectivity, and power status. The tab bar 208 may include one or more virtual buttons for activating commonly used functions. In the illustrated screen 202, for example, the commonly used functions may be functions such as, for example, a home function for transitioning the screen to a home screen or another screen, a search function, a listing of recent messages, and a communication function for communicating with friends. In some example embodiments, the content items are displayed as a scrollable list of content items.

In embodiments, a swipe gesture may be associated with a particular one of the displayed messages based on the location of the swipe on the display screen. For example, in the illustration of FIG. 2A, the finger 214 swipes within an area 212 which is logically associated in the client device 104 with message 206.

During or immediately following the swipe gesture, a sentiment indicia 216 is displayed on the screen 202. In some example embodiments, the sentiment indicia 216 appears at an initial position and moves along a trajectory to an ending position before disappearing. The sentiment indicia may also appear at some position subsequent to the initial position and/or disappear at some position before the ending position.

Figure 2B:
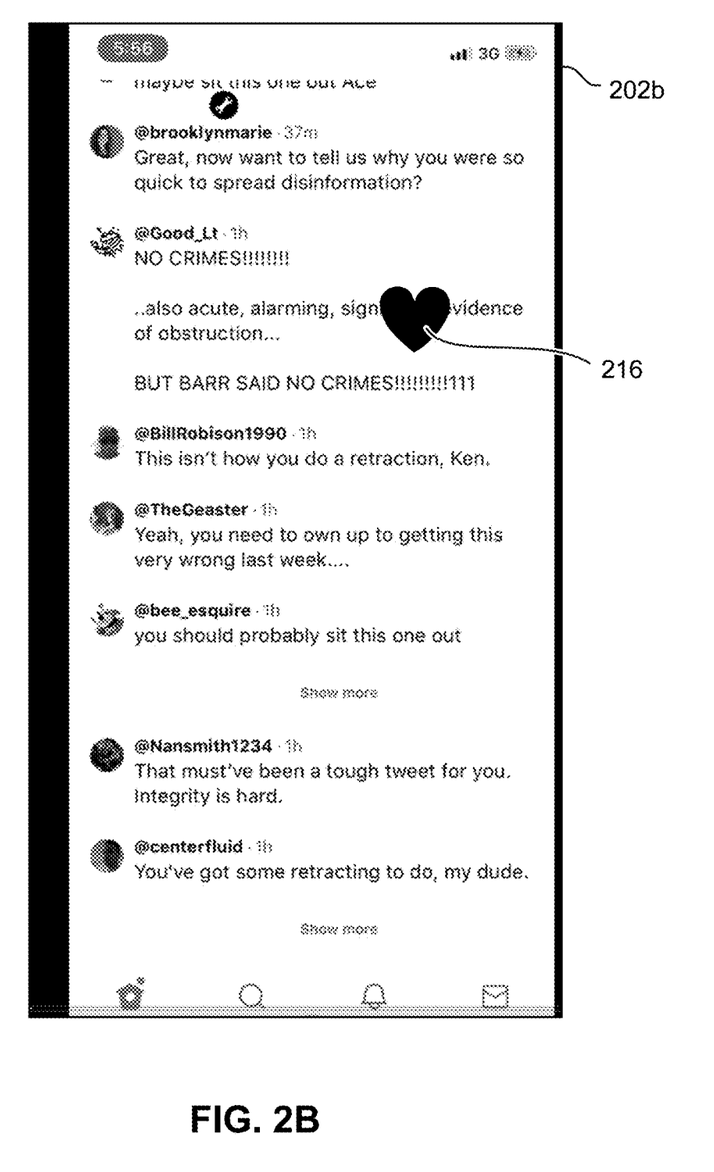

The screen 202b in FIG. 2B illustrates the sentiment indicia 216 during, or after, the swipe gesture along the trajectory. The user's finger 214 is not shown in FIGS. 2B, 2C, and 2D for ease of illustration. The sentiment indicia 216 is not limited to a heart-shaped image. In some example embodiments, any indicia representative of a "like" operation (e.g., a happy face, thumb up) can be used as the sentiment indicia 216. In some other example embodiments where the swipe gesture is used to associate a sentiment other than "like" with the respective messages, an icon representative of that other sentiment (e.g., sad face or thumb down for a "dislike" sentiment) can be used as the sentiment indicia 216.

In some example embodiments the trajectory of the sentiment indicia 216 is the same as, or tracks very closely (e.g. within a predefined distance threshold) to, the path of the swipe gesture on the touchscreen. In some example embodiments, the start position of the trajectory maybe near the edge of the screen on the side at which the swipe was initiated. In some example embodiments, the end position may be at or near the center of the screen area within the logical area 212. The trajectory may form a straight line, arc or other shape between the start position and the end position. In some embodiments, in addition to the start/end position of the swipe gesture, the determination of the trajectory may also account for the content layout on the screen. For example, the trajectory may be determined to minimize occlusion of content while still staying within the bounds of the logical area of the one or more messages to which the swipe is applied. In some example embodiments, the start position and end position may be at opposite ends of the logical area 212. In some other example embodiments, the start position and the end position may be overlapping each other, and or too near each other such that the moving of the sentiment indicia 216 along the trajectory from the start position to the end position is not noticeable. In some example embodiments, the sentiment indicia 216 start and end positions overlap regardless of the path of the swipe gesture.

Figure 2C:
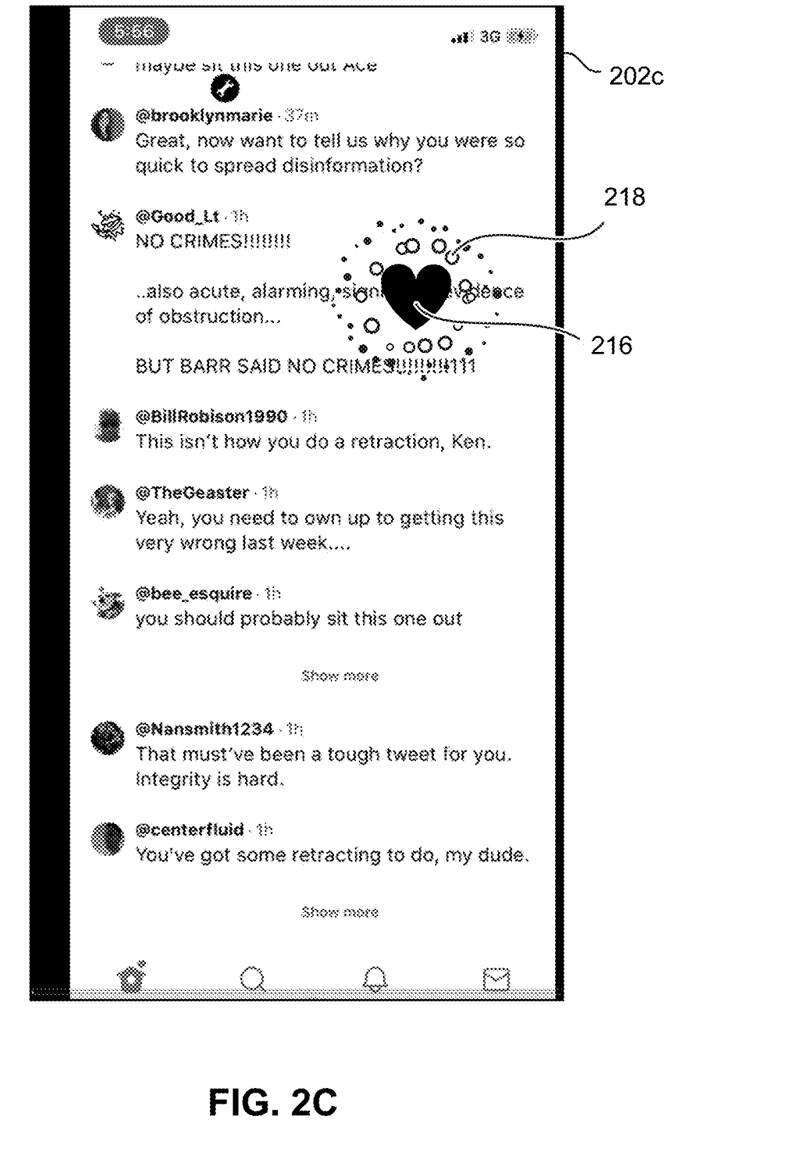

The screen 202c in FIG. 2C illustrates the sentiment indicia 216 with special effects 218. In the illustrated example, the special effects may be intended to illustrate the sentiment indicia 216 emanating confetti. For example, the special effects may represent the bursting of the sentiment indicia 216 with confetti. In some example embodiments, the special effects may be displayed momentarily before the sentiment indicia 216 disappears from the trajectory and/or the screen 202. The special effects may be provided, for example, to indicate to the user that the sentiment has been associated with the message.

Figure 2D:
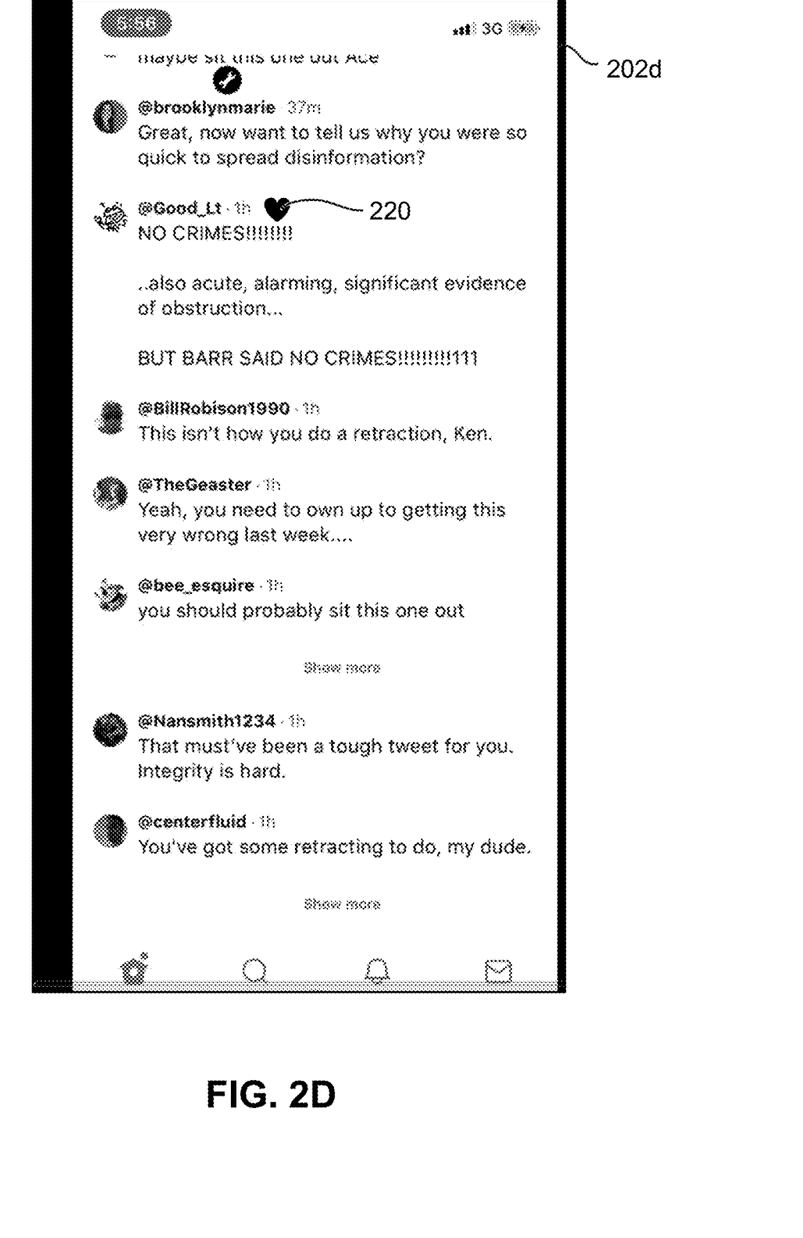

The screen 202d in FIG. 2D shows the state of the screen 202 after the sentiment indicia 216 has disappeared from the trajectory and/or the screen 202. An indicator 220 is now associated with the particular message 206 on which the swipe gesture was performed.

According to some example embodiments, the sentiment indicator 220 is a heart-shaped image representing that the particular message 206 has been "liked" by the user of the client device (e.g. the user logged in via the client device 104 to the social media application). It should be noted that embodiments are not limited to using heart-shaped images for indicator 220. In some embodiments, the indicator 220 can be any image, graphic, and/or alphanumeric identifier. It should also be noted that example embodiments are not limited to displaying the indicator 220 in the illustrated position in relation to message 206. In example embodiments, the indicator 220 can be displayed anywhere within the logical boundary 212 associated with the particular swiped message 206. In some other example embodiments, the indicator 220 can be displayed elsewhere on screen 202 but outside of the logical area 212, while visually indicating its association with the particular message 206.

The above described swipe-to-like operation enables the screen to not include buttons (e.g. virtual button(s) associated with respective displayed messages) dedicated for expressing particular sentiments, and thus increases the area available for displaying messages and further reduces clutter on the screen. When the content items are scrollable, a swipe gesture in a direction orthogonal to the swipe gesture for causing the swipe-to-like operation can be used to effect the scrolling. In some embodiments, a swipe gesture in a vertical direction (e.g. top-to-bottom or bottom-to-top direction on the display screen, subject to a predefined error tolerance) is considered a swipe gesture for scrolling and a swipe gesture in a substantially orthogonal direction is considered as a swipe for swipe-to-like. By configuring for different swipe gestures to be used for scrolling the list of messages and to selectively express sentiments on individual messages or groups of messages, embodiments may provide the user with a faster way in which to express a sentiment associated with a displayed message, and thus enable faster viewing/reading of messages in a list of messages.

Figure 3:
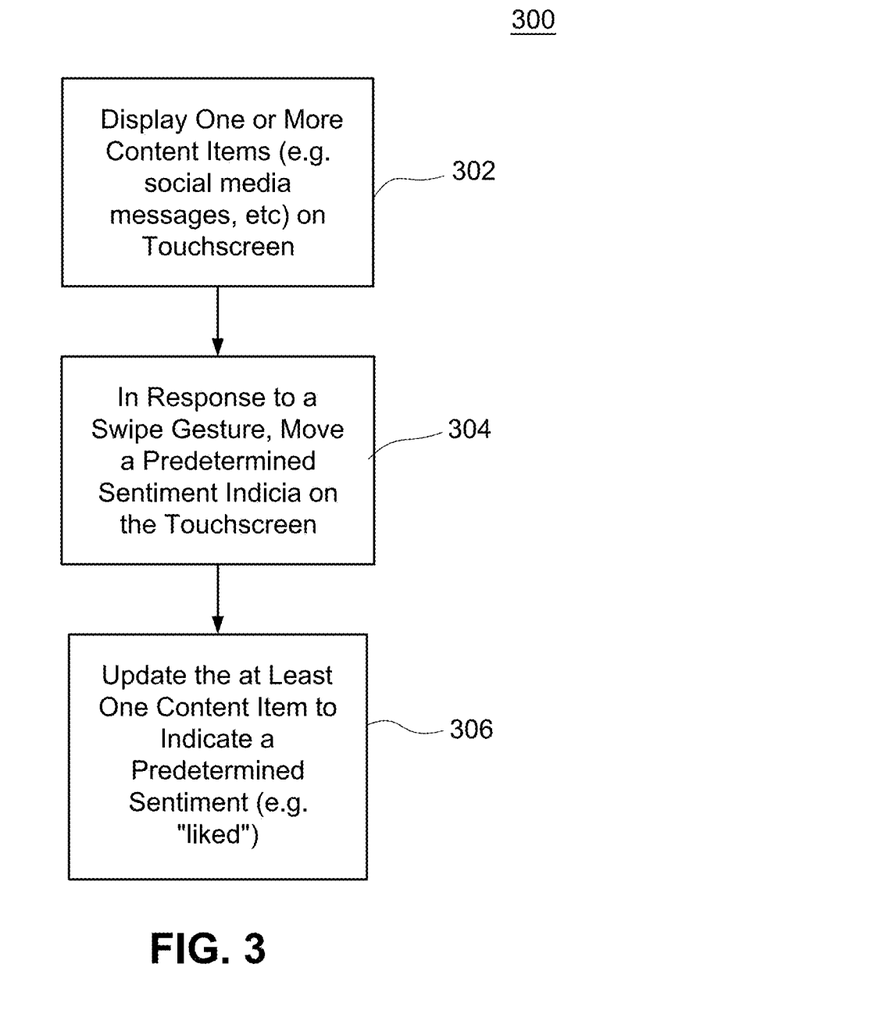
FIG. 3 illustrates a flowchart for a swipe-to-like process according to one or more example embodiments.

FIG. 3 illustrates a flowchart for a process 300 for performing the swipe-to-like functionality in a device such as, for example, client device 104 of a messaging system 100, according to some example embodiments.

After entering process 300, at operation 302, one or more content items are displayed on the touchscreen of a client device. For example, client device 104 may display content items from a timeline of messages sent from the messaging platform 102 to the account of the user of the client device. In FIG. 2 described above, the shown content items comprise a timeline of social media messages. However, the content items in example embodiments are not limited thereto, and can include any of social media messages, email messages, text messages, advertisements, news items, video thumbnails, and the like, and combinations thereof. In some embodiments, a plurality of content items are displayed on the screen at a time. In some other embodiments, a single content item is displayed on the screen at a time.

At operation 304, a touch input corresponding to a swipe gesture is detected. The detection may be based upon the touch input satisfying one or more predetermined criteria. For example, in order for a touch input on the touchscreen to be detected as a swipe gesture capable of effecting the swipe-to-like feature, the client device would determine that the touch input (e.g. the touchscreen contact during the swipe gesture) satisfies one or more predetermined thresholds. These thresholds may be preconfigured in the client device and/or may be received from the message platform 102.

The swipe gesture may be associated with one or more of the displayed messages based on the location of the swipe gesture. For example, when the swipe gesture has its start and/or end positions in the logical area 212 associated with message 206, the swipe may be associated with the message 206. In some embodiments, if the swipe gesture spans the logical areas of multiple messages, then the swipe may be associated with each of the multiple messages. Detection of the swipe gesture and the determination of the content item associated with the display area in which the swipe gesture is detected may be performed by the swipe-to-like module 126 based on signals/messages received from the touch screen and other system components of the client device. Known techniques may be used to determine the touch location(s), the path of the touch, type of touch, level of pressure associated with the touch, multi-touch detection, and timings and the like associated with the touch.

In response to the detection of the touch input, a sentiment indicia (e.g. sentiment indicia 216) is displayed and, optionally, moved and/or otherwise animated on the touchscreen. As described in relation to FIG. 2, the sentiment indicia can be optionally moved along a trajectory within a logical area of the one or more messages with which the swipe gesture is associated. As also described in relation to FIG. 2, the sentiment indicia can be optionally animated by introducing special effects 218. The animation with special effects may be performed with or without the moving of the sentiment indicia.

At operation 308, one or more of the displayed content items selected by the swipe are updated to include an indicator of a predetermined sentiment. In FIG. 2, the use of the swipe gesture to associate a "like" sentiment with a selected message was illustrated. However, in some embodiments, other sentiments (e.g. "dislike" etc.) can be associated with the messages by the swipe gesture.

In some embodiments, an additional input may be conveyed in combination with the swipe-to-like gesture. For example, in some example embodiments, the user may follow the first swipe gesture with a second swipe gesture. The second swipe gesture may be made on multiple ones of the content items. In some embodiments, the second swipe gesture may be used to associate the same sentiment as that of the first swipe gesture with the multiple content items on which the second swipe was made. In some embodiments, the second swipe gesture may be associated with a sentiment different from that of the first swipe gesture. In some embodiments, the first and second swipe gestures are associated with sentiments that are opposite to each other. For example, whereas the first swipe may be associated with the "like" sentiment, the second may be associated with a "dislike" sentiment. In some example embodiments, the second swipe gesture is made in a direction different to the first swipe gesture. In some example embodiments, the second swipe gesture is made in a direction substantially opposite to the first swipe gesture. In some embodiments, the second swipe gesture is performed following the first swipe gesture without lifting the finger from the touchscreen after the first swipe gesture.

In some embodiments, the second swipe gesture is in a substantially orthogonal direction and results, in addition to a sentiment such as like being attached to the content item in response to the first swipe gesture, in associating a level of importance with the content item. In some embodiments, based on the direction of the second swipe operation (e.g. up direction for a first level of importance, down direction for a second level of importance), either of two levels of importance may be associated with the content item. Each level of importance may be indicated by displaying the text and/or background of the content item in a distinctive color (e.g. content item without importance adjustment displayed in default white background, with first level of importance in a yellow background, and with a second level of importance in a blue background). The importance information associated with respective content items may be maintained by the client device locally and may be used for modifying the timeline received from the platform 102 to display to the user.

In some embodiments, for example, a swipe gesture followed with a second, different, gesture on the touchscreen may be detected in order to attach a sentiment such as "like" to a content item (in response to the first swipe gesture) and to additionally cause a second operation in relation to the same content item. The second gesture may be a long press, a swipe in a direction different from the first swipe as already described above, a tap with single finger, a tap with multiple fingers, etc. In some embodiments, the second gesture is required to be performed following the first swipe gesture while continuously maintaining the finger contact with the touchscreen. In some embodiments, the second gesture is detected by the system based on whether it is performed within a predetermined time interval (e.g., within a few tenths of a second, etc.) after the detected end of the first swipe gesture. The second operation, which is performed in response to the detection of the second gesture, may be an operation such as, for example, automatically providing for the user to reply to the content item, marking the content item as read (e.g. in order to remove the content item from the timeline within a predetermined time), making changes to the default sentiment associated with the swipe-to-like gesture, attaching a different sentiment to the content item, associating a level of importance to the content item, follow the sender of the content item (e.g. a "like-and-follow" combined operation), mute the sender of the content item (e.g. so that subsequently no content items from the sender is included in the user's timeline), and the like. The detection of the second gesture in combination with the first swipe gesture may be performed by the swipe-to-like module 126, using, for example, messages received from the touch screen control module and other system components of the client device.

For example, in some embodiments, a swipe on a content item followed by a long press attaches a sentiment (e.g. "like") to the content item as described above in relation to FIGS. 1-4 and opens input area in which the user can input a reply to the content item. The client device will transmit the user's reply to the content item to the platform 102. In another embodiment, the swipe followed by long press attaches the like sentiment to the content item and then forwards the content item.

In some embodiments, a tap as the above noted second gesture may cause the sentiment associated with the content item in response to the first swipe gesture to be enhanced. For example, a single tap with one finger detected as the second gesture may cause the "like" sentiment associated with the content item to be enhanced one level, and if two taps with one finger are detected, the "like" sentiment may be enhanced two levels. The enhanced sentiments associated with the content can be represented by the size, color and/or other change of the sentiment indicia (e.g. heart icon) associated with the content item. In another embodiment, a multi-finger (e.g. two finger) tap as the second gesture described above, causes a second sentiment, different from the sentiment associated with the first swipe gesture, to be associated with the content item. The client device may maintain the changes to the sentiment and/or the additional sentiment selections locally and may use them for modifying the timeline received from the platform 102 for displaying to the user, in some embodiments the client device may transmit this information to the platform 102 in a manner similar to how the sentiment associated with the swipe gesture is provided to the platform 102, or in some embodiments the client device may perform both maintaining the information locally and transmitting to the platform 102.

In some embodiments, the first gesture (i.e. the first swipe gesture) may be interpreted by the client device to cause different operations in response to differences in a detected characteristic of the first gesture. By detecting a level of pressure (e.g. average, maximum and/or minimum pressure detected on the touch screen by a pressure sensor associated with the first gesture) and by comparing the detected level of pressure to one or more predetermined ranges, the client device may, for example, associate the like sentiment with the content item when a first gesture is determined to be performed with "light" pressure, and, when the first gesture (occurring at another instance in time) is performed with a "heavier" pressure, associate the like sentiment with the content item and also perform a second operation such as, for example, following (or muting) the sender of the content item. In another embodiment, the first swipe gesture being performed with one finger causes the client device to associate the like sentiment with the content item, and, the first swipe gesture (occurring at another instance in time) being performed with two or more fingers (e.g. multi-touch) caused the client device to associate the like sentiment with the content item and also perform a second operation such as, for example, following (or muting) the sender of the content item.

In some embodiments, a first level of pressure in the first gesture in conjunction with a distance threshold and/or time threshold also satisfied by the first gesture, or a second level of pressure in the first gesture in conjunction with a time threshold also satisfied by the first gesture may cause either a sentiment (e.g. like or another sentiment noted above) to be associated with a message or an operation (e.g. mute, or another operation associated with a message as noted above) to be performed in association with a message. The message is one of the messages in the list of messages being displayed on the touch screen display upon which the gesture is detected, and the gesture is detected in the display area in which the message is displayed (e.g. in the area in which the message body is displayed, that is, the contact of the gesture may overlap the body of the displayed message). In some embodiments, the first gesture may include a long press operation.

Figure 4:
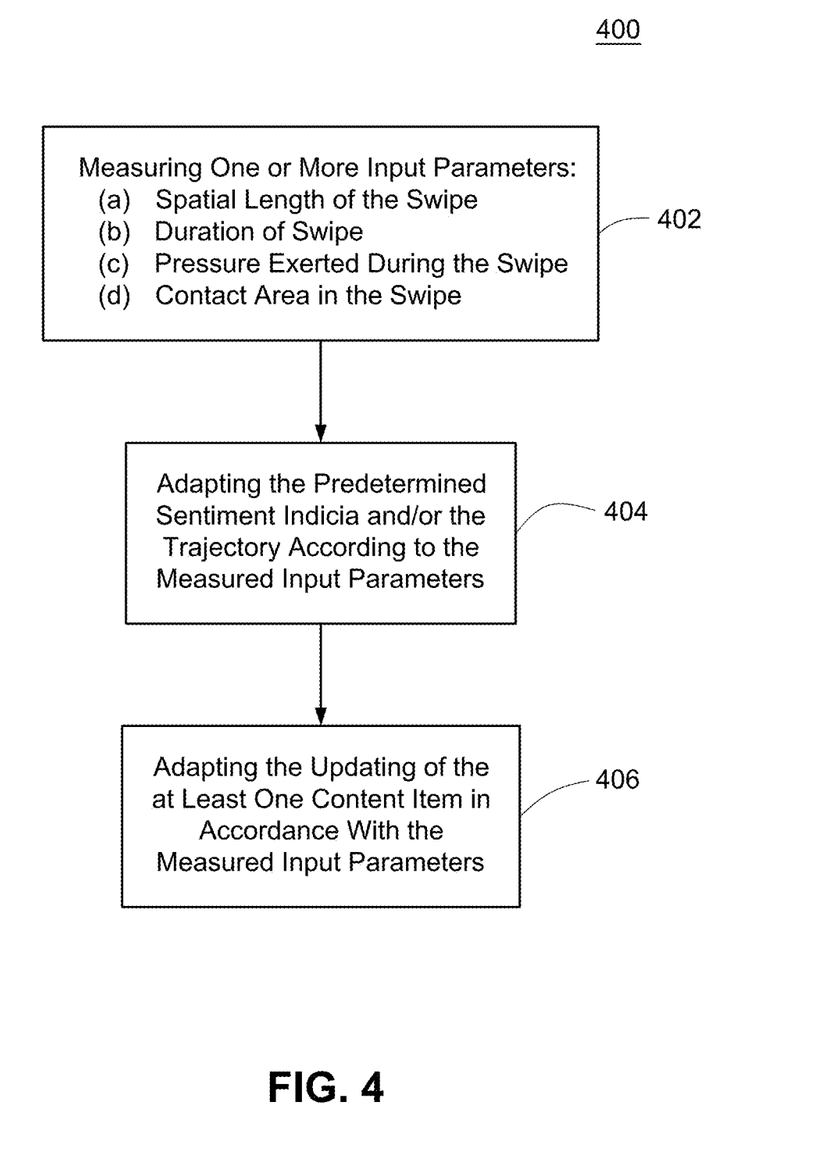
FIG. 4 illustrates a flowchart for a process for adapting certain characteristics of the process shown in FIG. 3 based on the swipe, in accordance with one or more example embodiments.

FIG. 4 illustrates a flowchart for a process 400 for performing the swipe-to-like functionality in a device such as, for example, client device 104. Process 400 may be used optionally to adapt the display of the sentiment indicia and/or the updating of the content items selected by the swipe operation in accordance with certain characteristics of the detected swipe.

Operation 402 is optionally performed during the detecting of the swipe gesture (e.g. during operation 304). In operation 402, one or more input parameters characterizing the touch input are determined by measuring one or more of the length of the swiping contact, the duration of the swiping contact, exerted pressure during the swipe, velocity of the swipe and/or the size/width of the contact area during the swipe. The particular measurements to be made may be determined by pre-configuration. For example, thresholds that qualify touch inputs and/or other motion-based non-touch inputs as swipe gestures that can give effect to the swipe-to-like feature may be specified in the swipe-to-like configurations module in the messaging platform 102 and provided to the client device.

An example spatial length (distance) threshold may imply that only inputs that maintain the swipe contact of a certain length (e.g. expressed in length units or as a proportion of the edge to edge width of the touchscreen) are to be considered as swipe gestures that cause activating the swipe-to-like feature. In some embodiments, the distance threshold may require the swipe to be exercised across a content item, or to swipe across a predetermined minimum percentage of the display area occupied the content item. An example time threshold may imply that only touch inputs that maintain touchscreen contact during the swipe within a certain time range are to be considered as swipe gestures that cause activating the swipe-to-like feature. An example pressure threshold may imply that only touch inputs that maintain touchscreen contact within a certain range of exerted pressure are to be considered as swipe gestures that cause activating the swipe-to-like feature. An example velocity threshold may imply that only inputs that exceed a predetermined velocity are considered as swipe gestures for swipe-to-like. An example contact area threshold may imply that only touch inputs that are provided using a specified number of fingers and/or types of finger contact during the swipe are to be considered as swipe gestures that cause activating the swipe-to-like feature.

At operation 404, the sentiment indicia and/or the trajectory along which the sentiment indicia is moved is adapted in accordance with the one or more input parameters determined in operation 402.

In some example embodiments, the icon or image used as the sentiment indicia can be selected in accordance with the one or more input parameters. For example, based upon a value of the one or more input parameters, the sentiment indicia may be chosen and/or the size of the sentiment indicia can be chosen to represent a low degree of "like" or a high degree of "like", a low degree of "dislike", a high degree of "dislike" etc. For example, a high degree of "like" (signaled, for example, by a characteristic such as a longer distance of the swipe) may be represented by a large "heart" icon, whereas a low degree of "like" is represented with a small "heart" icon.

In some example embodiments, the animation of the sentiment indicia may be adapted in accordance with the one or more input parameters. For example, based upon a value of the one or more input parameters the special effects associated with the animation and/or the trajectory of the sentiment indicia can be adapted to represent a low degree of "like" or a high degree of "like", a low degree of "dislike", a high degree of "dislike" etc.

At operation 406, the updating of the content items performed at operation 306 is adapted in accordance with the one or more input parameters determined in operation 402. For example, based upon a value of the one or more input parameters a high or low degree or magnitude of "like" sentiment can be associated with the selected content item. In some embodiments, the messaging platform is notified to indicate that the selected content item is associated with the particular sentiment and optionally the degree of the particular sentiment. The messaging platform, in one or more of its repositories, stores the association of the selected content item and the sentiment and optionally the degree of the particular sentiment.

Figure 5:
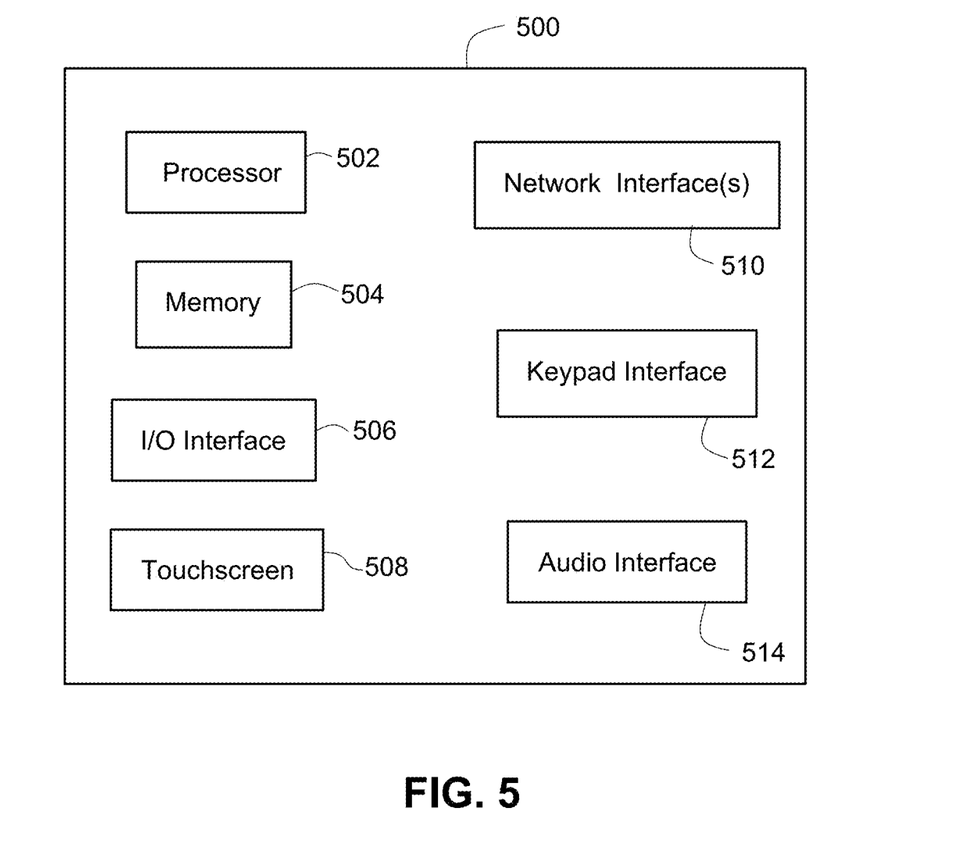
FIG. 5 illustrates a block diagram of an example client device in accordance with some example embodiments.

FIG. 5 illustrates an example computing device according to one or more aspects described herein. Computing device 500 may include one or more hardware and/or software components, such as processor 502, memory 504, input/output interface 506, touch sensitive display 508, network interface 510, keypad interface 512, and audio interface 514. By including one or more of these and/or other components, computing device 500 may be used as a desktop computer, laptop computer, server, tablet computer, netbook, cellular phone, mobile computing device, and/or the like. In at least one arrangement, computing device 500 may include a plurality of each of the components described herein. For instance, in at least one arrangement, computing device 500 may include two or more processors.

In one or more arrangements, processor 502 may execute computer-executable and/or computer-readable instructions stored in memory 504. For instance, processor 502 may execute instructions that cause one or more of the methods described herein to be performed by computing device 500. Additionally or alternatively, processor 502 may execute instructions that cause one or more user interfaces described herein to be displayed on a display included in computing device 500, such as touch sensitive display 508.

In one or more arrangements, touch sensitive display 508 (also referred to as "touchscreen") may comprise an electronic visual display (e.g., a liquid crystal display ("LCD") screen, a plasma display panel ("PDP"), a cathode ray tube ("CRT") display, a light emitting diode ("LED") display, and/or an organic light emitting diode ("OLED") display). Touch sensitive display 508 may respond to touch-based user input and thus may function as a "touch screen" display. Touch sensitive display 508 may implement one or more touch sensing technologies (e.g., resistive, surface acoustic wave, capacitive, strain gauge, optical imaging, dispersive signal technology, acoustic pulse recognition, coded LCD, etc.).

In one or more arrangements, input/output interface 506 may include one or more adapters, connection ports, and other components via which computing device 500 may provide input and output. For instance, input/output interface 506 may include one or more adapters for outputting data to and/or receiving data from a display (e.g., for providing audiovisual, graphical, and/or textual output), keypad, microphone, mouse, optical reader, scanner, speaker (e.g., for providing audio output), stylus, touch screen, and/or other component. Input/output interface 506 further may include a USB port, serial port, parallel port, IEEE 1394/Firewire port, APPLE iPod Dock port, and/or other ports.

In one or more arrangements, network interface 510 may establish and/or provide network connectivity to a network (e.g., a local area network, a wide area network, such as the Internet, etc.). Network interface 510 thus may include hardware and/or software components for communicating via Ethernet, TCP/IP, FTP, HTTP, HTTPS, and/or other protocols. The network interface 510 may additionally or alternatively establish and/or provide network connectivity to a wireless network (e.g., a local area network, a wide area network, such as the Internet, a cellular voice and/or data network, etc.). Wireless interface 512 thus may include hardware and/or software components for communicating via Ethernet, TCP/IP, FTP, HTTP, HTTPS, IEEE 802.11b/g/a/n, Bluetooth, CDMA, TDMA, GSM and/or other protocols.

In one or more arrangements, keypad interface 512 may include one or more physical keys, buttons, and/or switches that may be operated to provide input to and/or control various aspects of computing device 500. Audio interface 514 may include one or more speakers, audio ports (e.g., a headphone jack), microphones, and/or other audio components. Audio interface 114 may allow computing device 500 to provide audio feedback, receive audio input (e.g., sound input, speech commands, etc.), and/or provide telephone functionalities.

Figure 6:
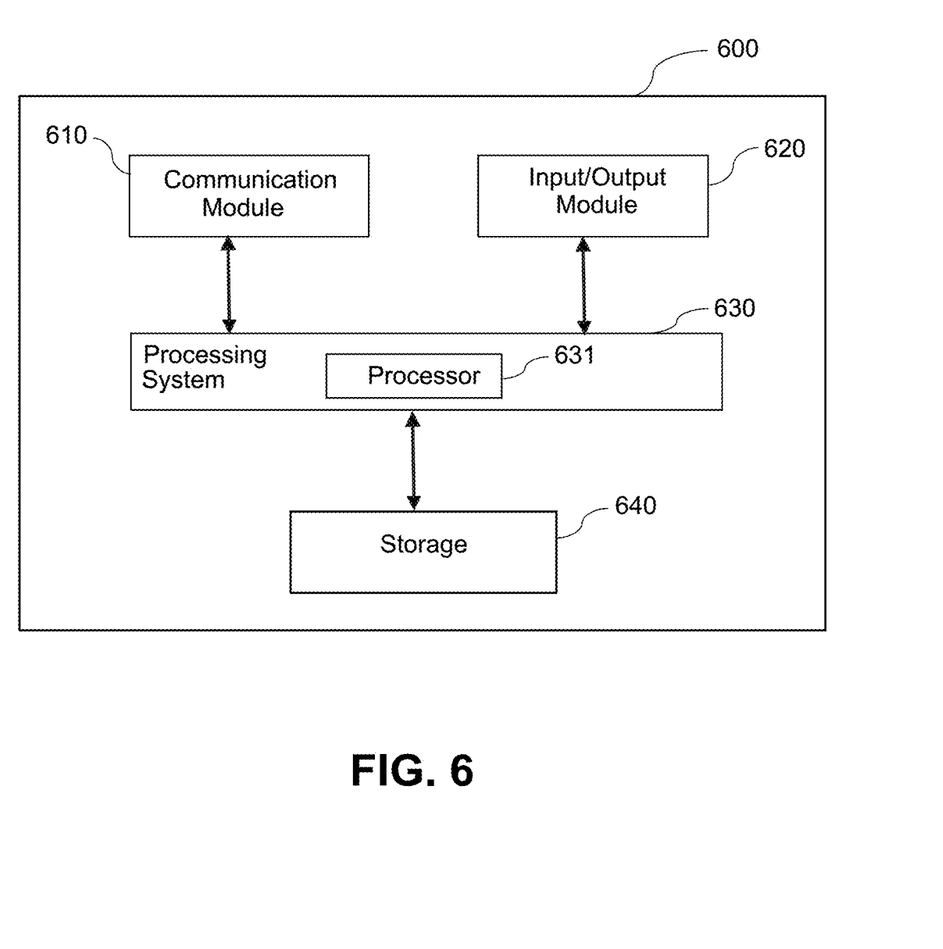
FIG. 6 illustrates a block diagram for an example computer on which the messaging platform and/or the client device can be implemented according to some example embodiments.

FIG. 6 illustrates a non-limiting, example block diagram for an example device 600. The example device 600 may be a computer implementing any of the clients or any of the servers described above in connection with FIGS. 1-5, or a device hosting at least one of these clients and/or one of these servers. In this example embodiment, the device 600 includes a communication module 610 including communication circuitry and circuitry (e.g., a transceiver), an input/output module 620 including I/O circuits and circuitry, a processing system 630 including a processor, and a storage 640, all of which may be communicatively linked by a system bus, network, or other connection mechanisms.

The communication module 610 functions to allow the device 600 to communicate with one or more of the other devices (e.g., user devices, clients, servers or a global server). The communication module 610 is configured to transmit data to other devices and/or receive data from other devices.

In certain example embodiments, the communication module 610 may comprise one or more communication interfaces supporting satellite communications, radio communications, telephone communications, cellular communications, internet communications, and/or the like. In other example embodiments, the communication module 610 may comprise a wireless transceiver with connected antenna, a wireless LAN module, a radio-frequency (RF), Infrared, or Bluetooth® transceiver, and/or a near field communication transceiver module. One or more of these communication components may collectively provide a communication mechanism by which the device 600 can communicate with other devices, platform and/or networks.

The data storage 640 may comprise one or more volatile and/or non-volatile storage components, such as, a hard disk, a magnetic disk, an optical disk, read only memory (ROM) and/or random access memory (RAM), and may include removable and/or non-removable components. The date storage 640 may be integrated in whole or in part with the processing system 630.

The processing system 630 may comprise one or more processors 631, including one or more general purpose processors and/or one or more special purpose processors (i.e., DSPs, GPUs, FPs or ASICs). The processing system 630 may be capable of executing application program instructions (e.g., compiled or non-compiled program and/or machine code) stored in data storage 640 to perform any of the functions and processes described above. The data storage 640 may include non-transitory computer-readable medium, having stored thereon program instructions that, if executed by the processing system 630, cause the device 600 to perform any of the processes or functions disclosed herein and/or illustrated by the accompanying drawings.

In certain example embodiments, the program instructions stored in the storage 640 may include an operating system program and one or more application programs, such as program instructions for one of the above-described load balancers. For example, the operations in example processes of FIGS. 1-4 can be defined by the program instructions stored in the storage 640 and controlled by processing system 630 executing the program instructions.

The input/output module 620 of the device 600 may enable the device 600 to interact with a human or non-human user, such as to receive input from a user and to provide output to the user. The input/output module 620 may include a touch-sensitive or presence-sensitive panel, keypad, keyboard, trackball, joystick, microphone, still camera and/or video camera, and the like. The input/output module 620 may also include one or more output components such as a display device, which may be combined with a touch-sensitive or presence-sensitive panel. In an example embodiment, the input/output module 620 may display various user interfaces to enable a user or an operator to access services or functions provided by the device 600.

While the disclosed technology has been described in connection with what is presently considered to be the most practical and preferred embodiments, it is to be understood that the systems and method described herein are not to be limited to the disclosed embodiments, but on the contrary, are intended to cover various modifications and equivalent arrangements included within the spirit and scope of the appended claims.

What is claimed is:

1. A method performed by one or more processors of a device, comprising:
    receiving, using a network interface of the device, content items from one or more other devices;
    displaying a list of the content items on a display screen;
    detecting input of a first swipe gesture in a display area of the display screen; and
    in response to the detecting (1) identifying a first one of the content items in accordance with a trajectory of the first swipe gesture, and (2) associating a predetermined first sentiment with the first content item.

2. The method according to claim 1, wherein the predetermined first sentiment is a like sentiment.

3. The method according to claim 1, wherein the content items are messages.

4. The method according to claim 1, further comprising displaying indicia indicative of the predetermined first sentiment during input of the first swipe gesture.

5. The method according to claim 4, wherein the indicia is animated.

6. The method according to claim 4, wherein the indicia comprises a heart indicia.

7. The method according to claim 4, wherein the indicia is displayed in accordance with a threshold associated with the first swipe gesture.

8. The method according to claim 7, wherein the threshold corresponds to a distance.

9. The method according to claim 4, wherein a size of the indicia increases as a distance associated with the first swipe gesture increases.

10. The method according to claim 1, wherein a distance of the first swipe gesture correlates to an amount of the first sentiment.

11. The method according to claim 10, wherein the greater the distance of the first swipe gesture, the greater the amount of the first sentiment.

12. The method according to claim 1, wherein the first swipe gesture comprises a swipe gesture across the first content item.

13. The method according to claim 12, further comprising:
    based on detecting input of a second swipe gesture, different from the first swipe gesture, for multiple ones of the content items in the list, associating the first sentiment with each of the multiple content items.

14. The method according to claim 1, further comprising:
    based on detecting input of a second swipe gesture different from the first swipe gesture for the first content item, associating a predetermined second sentiment different from the first sentiment with the first content item.

15. The method according to claim 14, wherein the second swipe gesture is in a direction different from a direction of the first swipe gesture.

16. The method according to claim 14, wherein the second swipe gesture is in a direction substantially opposite from a direction of the first swipe gesture.

17. The method according to claim 1, further comprising:
    based on detecting input of a second swipe gesture different from the first swipe gesture for the first content item, further associating a level of importance with the first content item.

18. The method according to claim 1, further comprising:
    in response to detecting input of a second gesture different from the first swipe gesture for the first content item, performing, in addition to associating the predetermined first sentiment with the first content item, a second operation in relation to the first content item.

19. The method according to claim 1, further comprising:
    detecting a characteristic of the first swipe gesture; and
    based upon the detected characteristic, either performing the associating of the predetermined first sentiment with the first content item, or performing the associating of the predetermined first sentiment with the first content item and a second operation in relation to the first content item.

20. The method according to claim 1, wherein the content items comprise at least one of social media messages, advertisements, email messages, news items, video, multimedia messages or text messages.

21. The method according to claim 1, wherein indicia corresponding to the first sentiment is newly displayed in association with the first message after the input of the first swipe gesture.

22. The method according to claim 21, wherein a size of the indicia corresponds to an amount of the first sentiment determined based upon a characteristic of the first swipe gesture.

23. The method according to claim 1, wherein the list of content items is scrollable based on detecting input of a second swipe gesture different from the first swipe gesture.

24. A method performed by one or more processors of a device, comprising:
    receiving, using a network interface of the device, content items from one or more other devices:
    displaying a list of the content items on a touch screen display of a device;
    detecting input of a first swipe gesture in a display area of the display screen; and
    in response to the detecting (1) identifying a first one of the content items in accordance with a trajectory of the first swipe gesture, and (2) associating a predetermined first sentiment with the first content item, wherein the detecting of the first swipe gesture is in accordance with a level of pressure and a duration of a contact on the touch screen display.

25. The method according to claim 24, wherein the predetermined first sentiment is a like sentiment.

26. The method according to claim 24, wherein the content items are messages.

27. The method according to claim 24, wherein the first swipe gesture includes a long press gesture.

28. The method according to claim 24, wherein the method further comprises performing a predetermined first operation in association with the first content item.

29. The method according to claim 28, wherein the predetermined first operation is muting of a sender of the first content item.

30. A client device comprising:
    a network interface;
    a touchscreen display;

a processing system comprising at least one processor, wherein the processing system is configured to:
    receive, using the network interface, content items from one or more other devices;
    display a list of the content items on the touchscreen display;
    detect input of a first swipe gesture in a display area of the display screen; and
    in response to the detecting (1) identifying of a first one of the content items in accordance with a trajectory of the first swipe gesture, and (2) associate a predetermined first sentiment with the first content item.

31. A non-transitory computer readable storage medium storing program instructions that when executed by at least one processor of a computer, causes the computer to perform operations comprising:
    receiving, using a network interface of the computer, content items from one or more other computers:
    displaying a list of the content items on a touchscreen display;
    detecting input of a first swipe gesture in a display area of the display screen; and
    in response to the detecting (1) identifying a first one of the content items in accordance with a trajectory of the first swipe gesture, and (2) associating a predetermined first sentiment with the first content item.

32. A system comprising:
    a server device; and
    a plurality of client devices connected to the server device over a communication network,
    wherein the server device is configured to:
        receive new content items from respective client devices, and distribute the received new content items to groups of client devices;
        receive selection information associated with the distributed new content items; and
        update the distributed new content items in accordance with the received selection information,
    and wherein each client device being configured to perform operations comprising:
        displaying a list of content items from the distributed new content items on a display;
        detecting input of a first swipe gesture in a display area of the display; and
        in response to the detecting (1) identifying a first one of the content items in accordance with a trajectory of the first swipe gesture, an (2) associating a predetermined first sentiment with the first content item.

33. The system according to claim 32, wherein the server is further configured to store configuration information corresponding to the detecting.

34. The system according to claim 32, wherein at least one said client device detects the first swipe gesture based on a detected non-touch gesture.

\* \* \* \* \*